Patented July 5, 1927.

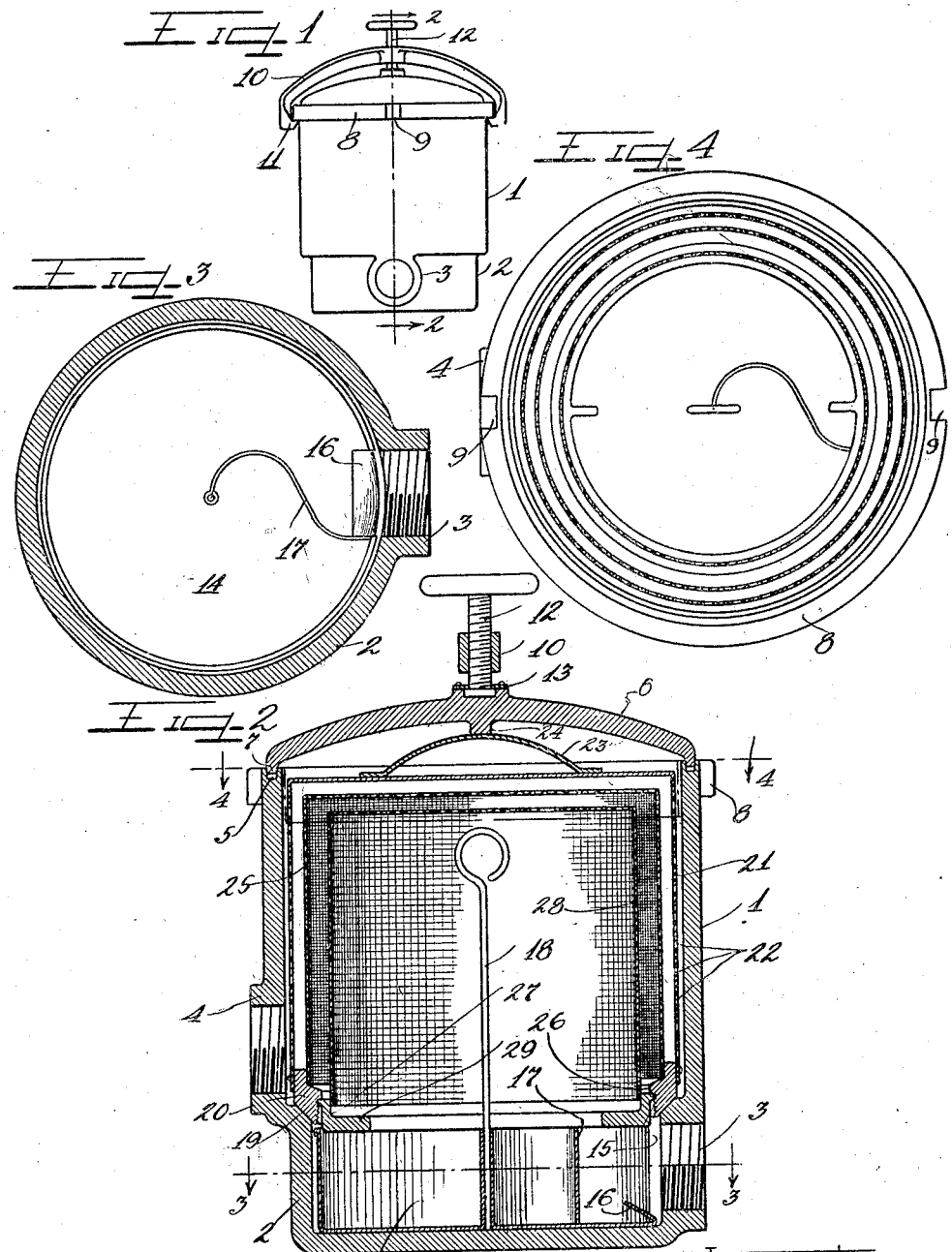

1,634,463

UNITED STATES PATENT OFFICE.

HENRY A. HILLS, OF GRAND RAPIDS, MICHIGAN.

LIQUID TRAP AND STRAINER.

Application filed December 1, 1922. Serial No. 604,181.

This invention relates to a combined trap and strainer for separating foreign matter and fluids of greater specific gravity from liquids, with particular reference to hydrocarbon fluids carrying water and solid matter in suspension.

It is an object of this invention to provide an easily cleanable combined trap and strainer wherein the component parts can all be removed by loosening a single cover clamp and removing the cover.

It is a further object of this invention to cause the entering fluid to swirl to cause more prolonged and even contact thereof with the straining means and to prevent foreign matter from lodging on the screens and filling up the interstices thereof.

It is another object of this invention to provide a deflector at the place of entrance of the fluid which in connection with the change in the velocity of the fluid due to the suddenly increased area offered by the trap, will cause the deposit of a large part of the heavier foreign matter in the undisturbed area afforded by the deflector in the bottom of the trap.

It is still a further object of this invention to provide a plurality of spaced filtering elements, of progressively finer gauge, so arranged that they may be readily separated to remove the foreign matter deposited between the different elements.

It is still another object of this invention to provide a single clamping means which will secure not only the cover but the interior members of the strainer against movement or leakage.

It is a still further object of this invention to provide an easily manufactured and assembled trap and strainer that can be manufactured at a cost comparing favorably with the less efficient traps or strainers now in existence.

Other and further important objects of this invention will be apparent from the disclosures in the specification and the accompanying drawings.

The invention (in a preferred form) is illustrated on the drawings and hereinafter more fully described.

On the drawings:

Figure 1 is an elevation of a device embodying a preferred form of this invention.

Figure 2 is an enlarged section on the line 2—2 of Figure 1.

Figure 3 is a section on the line 3—3 of Figure 2.

Figure 4 is a section on the line 4—4 of Figure 2.

As shown on the drawings:

The numeral 1 refers to a body or container of a form suited for the particular installation requirements to be met. As shown, the body is in the form of a cylinder having a slightly reduced portion 2 at the bottom for purposes that will be brought out hereinafter. Inlet 3 and outlet 4 bosses are provided for suitable pipe connections. The top edge of the body has an annular groove 5 therein and a cover 6 has an edge 7 corresponding to and adapted to enter said groove to serve as a seal. The body has a rim 8 provided with oppositely disposed breaks 9 therein to allow a clamp 10 with inwardly directed claws 11 to be slipped past the rim and given a partial turn so that the claws will engage below the rim.

A screw 12 threaded in the center of the clamp 10 engages the center of the cover to seal the joint. Retaining means 13 are provided for securing the foot of the screw in the cover while allowing relative rotation thereof so that the clamp and cover will be removed together.

The inlet 3 previously mentioned is adjacent the lower portion 2 of the body which contains a pan 14 having an opening 15 in its side adapted to register with the inlet and having a deflector 16 formed of the material of the pan adapted to give an upward trend to the inflowing oil. In connection with the pan is a baffle 17 formed to give a swirling motion to the oil so that in combination with the deflector 16 the incoming oil follows an upward spiral course. A handle 18 is secured to the pan and baffle to assist in lifting it out of the body.

Just above the lower portion and formed in the shoulder produced by the enlargement of the body is an angular seat 19 on which an annular ring 20 seats to form a seal. A sheet metal cover 21 spaced from the walls of the body has a large number of small apertures 22 in its walls and is secured to the outer surface of the annular ring. This cover 21 has a handle 23 which is engaged by a boss 24 on the under side of the body cover 6, so that the latter holds down the sheet metal cover and the annular ring secured thereto is assured a proper seat.

A fine mesh screen 25 is formed in a shape similar to the sheet metal cover and secured to the inner face of the annular ring so as to be spaced from the cover. A shoulder 26 is provided on the inner circumference of the ring 20, and a second and smaller ring 27 carrying a second and coarser screen 28 seats against this shoulder and is retained thereagainst by suitable matching threads on each member. Projections 29 are formed on the ring 27 to assist in removing it from the outer annular ring.

The assembly of this device will be self-evident after the above description, and a short description of the operation thereof is believed to be sufficient for a clear understanding.

Liquid entering at the inlet 3 is given an upward spiral movement by the deflector 16 and baffle 17 tending to wash the inner screen, and to deposit its bulkier foreign matter in the pan 14 because of the decrease in velocity of the liquid as it leaves the inlet. The coarse inner screen 28 serves to separate the larger particles of foreign matter, and the fine screen 25 gathers the finer matter. From the finer mesh screen the oil emerges from the sheet metal cover 21 through the apertures therein 22 and collects in the annular space between the sheet metal cover and the body, passing through the outlet 4 provided therefor.

When it is desired to clean out the device, releasing the pressure of the screw 12 permits disengaging the claws of the clamp 10 and lifting off the cover 6, whereupon the entire screen and cover assembly can be lifted out by the handle 23, and the pan 14 with the sediment gathered therein removed and cleaned. The inner coarse screen 28 can easily be removed from the fine mesh screen and cover assembly by grasping the projections 29, and unscrewing the ring 27.

I am aware that numerous details of construction may be varied through a wide range without departing from the principles of this invention, and I therefore do not purpose limiting the patent granted otherwise than necessitated by the prior art.

I claim as my invention:

1. In a fluid trap and strainer, a casing, a sediment pan located in the lower portion thereof, strainers opening downwardly above the pan and serving to hold the pan in place, a deflector in said pan adapted to cause upward motion of the entering oil into said strainers, and a baffle in said pan adapted to impart a rotary motion to the upwardly flowing oil.

2. In a liquid trap and strainer, a casing having an inlet and an outlet, a sediment pan in said casing having an opening in one side adapted to register with the casing inlet, and having a reverting lip at the base of said opening forming a deflector in said pan adapted to impart an upward motion to the entering fluid, and a baffle in said pan adapted to impart a rotary motion to the upwardly flowing fluid.

3. In a liquid trap and strainer, a casing having an inlet and an outlet, a sediment pan in the lower portion of said casing having an opening in one side adapted to register with the casing inlet and removable through the top of the casing, a deflector in said pan adapted to impart an upward motion to the entering fluid, a baffle in said pan adapted to impart a rotary motion to the upwardly flowing fluid, and a filter in said casing between the pan and the casing outlet, said filter opening above the pan and normally serving to confine the pan in position.

4. In a liquid trap and strainer, a casing having an inlet and an outlet, a removable sediment pan in said casing having an opening in one side adapted to register with the casing inlet, a deflector in said pan adapted to impart an upward motion to the entering fluid, a baffle in said pan adapted to impart a rotary motion to the upwardly flowing fluid, a plurality of removable spaced filtering elements in said casing above said pan and between the same and the casing outlet, and a removable cover for said casing through the opening closed by which said spacing elements and pan may be removed.

5. In a fluid trap and strainer, a casing, a sediment pan seated in the lower portion thereof, strainers disposed within the casing and opening downwardly above the pan, said strainers being prevented from upward movement in the casing and serving to hold the pan in position, means within the pan to deflect oil upwardly within the strainers and to impart rotary motion to the upwardly deflected oil, and a handle attached to the said pan and upstanding within the strainers to facilitate removal of the pan after removal of the strainers.

6. In a fluid trap and strainer, a casing, a sediment pan in the lower portion thereof, strainers inverted within the casing and opening downwardly over the pan, an apertured cover enclosing the strainers within and spaced from the casing, connected members at the lower ends of the strainers and cover and supporting the same in spaced relation to one another, said connected members normally serving to prevent vertical displacement of the pan, and means engaging the cover at its top and serving to normally hold the same and said strainers in place.

In testimony whereof I have hereunto subscribed my name.

HENRY A. HILLS.